(12) United States Patent
Yu et al.

(10) Patent No.: US 11,863,077 B2
(45) Date of Patent: Jan. 2, 2024

(54) POWER SUPPLY SYSTEM WITH ACTIVE CLAMPING

(71) Applicant: TEXAS INSTRUMENTS INCORPORATED, Dallas, TX (US)

(72) Inventors: Sheng-Yang Yu, Plano, TX (US); Lieh-Chung Yin, Taoyaun (TW)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 131 days.

(21) Appl. No.: 17/539,125

(22) Filed: Nov. 30, 2021

(65) Prior Publication Data

US 2023/0170812 A1 Jun. 1, 2023

(51) Int. Cl.
*H02M 3/335* (2006.01)
*H02M 1/08* (2006.01)

(52) U.S. Cl.
CPC ....... *H02M 3/33573* (2021.05); *H02M 1/083* (2013.01); *H02M 3/33576* (2013.01)

(58) Field of Classification Search
CPC ......... H02M 3/33573; H02M 3/33576; H02M 3/33569; H02M 3/33515; H02M 1/083; H02M 1/12; H02M 1/24; H02M 1/32
See application file for complete search history.

(56) References Cited

U.S. PATENT DOCUMENTS

| | | | |
|---|---|---|---|
| 8,699,237 B2 * | 4/2014 | Pan ........................ | H02M 1/34 |
| | | | 363/133 |
| 9,118,259 B2 * | 8/2015 | Ye ..................... | H02M 7/53871 |
| 10,756,635 B2 * | 8/2020 | Hari .................. | H02M 3/33523 |

* cited by examiner

*Primary Examiner* — Adolf D Berhane
(74) *Attorney, Agent, or Firm* — Charles F. Koch; Frank D. Cimino (57) ABSTRACT

A power supply system includes an input stage comprising first and second input switches to provide a primary current responsive first and second input switching signals. A transformer generates a secondary current responsive to the primary current. An output stage comprises an output, a first output switch, a second output switch and a clamping switch. The output stage can be configured to generate an output voltage at the output by rectifying the secondary current responsive to respective first and second output switching signals. The clamping switch can be configured to close responsive to a clamp switching signal during an activation dead-time between closing the first input switch and the second input switch. The system further includes a switching controller configured to generate the first and second input switching signals and the first and second output switching signals based on the output voltage, and to generate the clamp switching signal.

21 Claims, 4 Drawing Sheets

POWER SUPPLY SYSTEM WITH ACTIVE CLAMPING

TECHNICAL FIELD

This description relates generally to electronic circuits, and more particularly to a power supply system with active clamping.

BACKGROUND

Power supply circuits can be implemented in a variety of different ways. Examples of power supply circuits include synchronous rectifier power converters, asynchronous rectifier power converters, resonant power converters, and any of a variety of other types of switching power converters. A typical power supply circuit can thus activate one or more switches to convert an input voltage to an output voltage. Typical power supply circuits can implement a transformer for delivering an output voltage on the secondary winding of a transformer from a square-wave input voltage applied by the switches to the primary winding of the transformer. Base on the resonant characteristics between the windings of the transformer and circuit component parasitic effects, the current in the primary and secondary windings can exhibit ringing, which can result in an induced voltage ringing on both input switches and output switches.

SUMMARY

A power supply system includes an input stage comprising first and second input switches to provide a primary current responsive first and second input switching signals. A transformer generates a secondary current responsive to the primary current. An output stage comprises an output, a first output switch, a second output switch and a clamping switch. The output stage can be configured to generate an output voltage at the output by rectifying the secondary current responsive to respective first and second output switching signals. The clamping switch can be configured to close responsive to a clamp switching signal during an activation dead-time between closing the first input switch and the second input switch. The system further includes a switching controller configured to generate the first and second input switching signals and the first and second output switching signals based on the output voltage, and to generate the clamp switching signal.

An integrated circuit (IC) includes a switching controller. The switching controller is configured to receive an output voltage from an output stage of a power supply circuit and to generate a first input switching signal and a second input switching signal based on the output voltage. The first and second input switching signals can be provided to a first input switch and a second input switch, respectively, of an input stage of the power supply circuit. The input stage can be coupled to the output stage through a transformer. The switching controller can also be configured to generate a first output switching signal and a second output switching signal that are provided to a first output switch and a second output switch, respectively, of the output stage of the power supply circuit based on the output voltage. The switching controller can be further configured to generate a clamp switching signal that is provided to an active clamping circuit of the output stage. The active clamping circuit can have a clamping switch configured to activate during an activation dead-time between activation of the first input switch and the second input switch responsive to the clamp switching signal.

A circuit includes a power supply circuit including an output, an input stage, and an active clamping circuit. The input stage can include first and second input switches, and the active clamping circuit can include a clamping switch having a first input. The circuit also includes a switching controller having an input, a first output, a second output, and a third output. The input of the switching controller can be coupled to the output of the power supply circuit. The first output can be coupled to the first input switch, the second output can be coupled to the second input switch, and the third output can be coupled to the first input. The switching controller can be configured to provide a clamp switching signal at the third output to close the clamping switch during an activation dead-time between closing the first input switch and the second input switch.

DETAILED DESCRIPTION

This description relates generally to electronic circuits, and more particularly to a power supply system with active clamping. The power supply system includes an input stage, an output stage, a transformer interconnecting the input and output stages, and a switching controller. The input stage includes a set of input switches that are alternately activated to provide a primary current through a primary winding of the transformer. As described herein, the term "activate", as describing a transistor, refers to providing sufficient bias (e.g., gate-source voltage for a field-effect transistor (FET)) to operate the transistor device in saturation mode. Similarly, the term "deactivate", as describing a transistor, refers to removing bias to operate the transistor device in cutoff mode. As an example, the input stage can be arranged as a full-bridge input stage that includes a set of input four switches, with alternate pairs of the input switches being activated to provide the primary current through the primary winding of the transformer. The output stage includes a set of output switches that are alternately activated to rectify a secondary current that is induced in the secondary winding of the transformer and is provided to an output to provide an output voltage to a load. As an example, the output stage can be arranged as a full-bridge output stage that includes a set of four output switches, with alternate pairs of the output switches being activated to rectify the secondary current provided from the secondary winding of the transformer. The input and output switches are activated by input switching signals and output switching signals, respectively, that are provided from the switching controller.

The output stage also includes an active clamping circuit. As an example, the active clamping circuit includes a clamping switch and a capacitor arranged in series across the output. The clamping switch can be activated responsive to a clamp switching signal to generate a clamping current that can mitigate ringing in the output stage, thereby mitigating energy inefficiencies caused by voltages being exhibited across the output switches of the output stage. Also, the clamping switch can be activated during a dead-time between activation of a first input switch (or first pair of input switches) and a second input switch (or second pair of input switches) of the input stage to enable zero-volt switching (ZVS) on the input switches. As described herein, ZVS is defined as activating a respective one of the switches (e.g., input or output switches) with a drain-source voltage $V_{DS}$ of approximately zero volts (e.g., +/- approximately 5%). As a first example, the power supply system can operate in continuous conduction mode (CCM), so the clamping switch can be activated at a predetermined time that is approximately half a ringing period of the primary current after deactivation of each of the input switches to facilitate ZVS. As a second example, the power supply system can operate in discontinuous conduction mode (DCM), so the clamping switch can be activated at a predetermined time that is prior to the activation of each of the input switches, along with concurrent activation of one of the output switches (or one of the pairs of output switches) to facilitate ZVS. As a result, the power supply system can operate more efficiently by mitigating ringing in the output stage and by implementing ZVS in the input stage.

Figure 1:
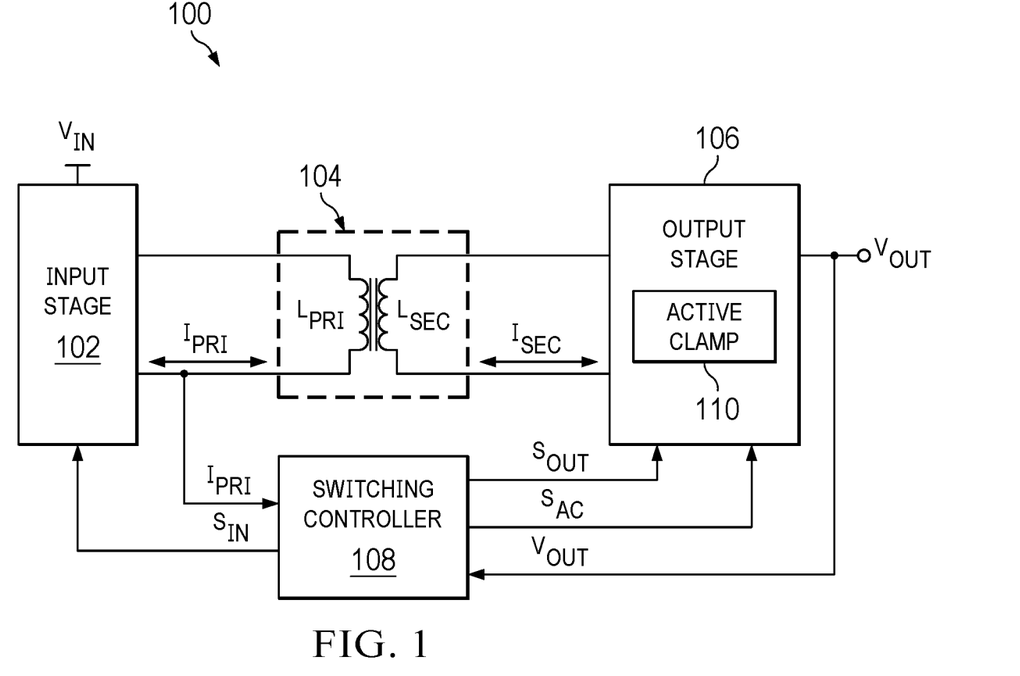
FIG. 1 is a block diagram of a power supply system.

FIG. 1 is a block diagram of a power supply system 100. The power supply system 100 can be configured to generate an output voltage $V_{OUT}$ based on an input voltage $V_{IN}$. The power supply system 100 can be implemented in any of a variety of direct current (DC) power-providing applications.

The power supply system 100 includes an input stage 102, an output stage 104, a transformer 106, and a switching controller 108. The input stage 102 includes a set of input switches that are alternately activated responsive to a respective set of input switching signals Sir to provide a primary current $I_{PRI}$ through a primary winding $L_{PRI}$ of the transformer 106. As an example, the input stage 102 can be arranged as a full-bridge input stage that includes a set of input four switches, with alternate pairs of the input switches being activated to provide the primary current $I_{PRI}$ through the primary winding $L_{PRI}$ of the transformer 106. The output stage 104 includes a set of output switches that are alternately activated by a respective set of output switching signals $S_{OUT}$ to rectify a secondary current $I_{SEC}$ that is induced in the secondary winding $L_{SEC}$ of the transformer 106 and is provided to an output to provide the output voltage $V_{OUT}$ to a load. As an example, the output stage 104 can be arranged as a full-bridge output stage that includes a set of four output switches, with alternate pairs of the output switches being activated to rectify the secondary current $I_{SEC}$ provided from the secondary winding $L_{SEC}$ of the transformer 106.

In the example of FIG. 1, the output stage 104 further comprises an active clamping circuit 110 ("ACTIVE CLAMP"). The active clamping circuit 110 can include a clamping switch (e.g., transistor) and a capacitor in series across the output stage 104. The active clamping circuit 110, responsive to activation of the clamping switch by a clamp switching signal $S_{AC}$, can conduct a clamping current to the output of the output stage 104 to mitigate ringing of the secondary current $I_{SEC}$ in the output stage 104. As an example, the ringing can occur based on resonant oscillation between the parasitic capacitance of the output switches in the output stage 104 and an output inductor (e.g., and a resonant inductor of the transformer 106, as well). The ringing can thus be exhibited during a dead-time between activation of the input switches in the input stage 102, thereby providing power inefficiencies based on a drain-source voltage $V_{DS}$ being exhibited on the output switches in the output stage 104. Thus, the clamping current can include a portion of the ringing secondary current $I_{SEC}$ to clamp the drain-source voltage $V_{DS}$, thereby providing for a more energy efficient operation of the power supply system 100.

As an example, the switching controller 108 can be arranged in or as part of an integrated circuit (IC). The switching controller 108 is configured to generate the input switching signals Sir and the output switching signals $S_{OUT}$. In the example of FIG. 1, the switching controller 108 receives the output voltage $V_{OUT}$ as an input, so the switching controller 108 can control the activation of the input switches in the input stage 102 based on the input switching signals Si and the activation of the output switches in the output stage 104 based on the output switching signals $S_{OUT}$ in response to the output voltage $V_{OUT}$ (e.g., in a pulse-width modulation (PWM) scheme). Also, the switching controller 108 is configured to provide the clamp switching signal $S_{AC}$ to the clamping switch of the active clamping circuit 110. The switching controller 108 is configured to activate the clamping switch of the active clamping circuit 110 during a dead-time between activation of a first input switch (or first pair of input switches) and a second input switch (or second pair of input switches) of the input stage 102 to facilitate zero-volt switching (ZVS).

As a first example, the power supply system 100 can operate in continuous conduction mode (CCM). Thus, to facilitate ZVS, the clamping switch of the active clamping circuit 110 can be activated at a predetermined time that is approximately half a ringing period of the primary current $I_{PRI}$ after deactivation of each of the input switches of the input stage 102. In the example of FIG. 1, the primary current $I_{PRI}$ is provided to the switching controller 108, such as to achieve peak current mode control or to use as an indication of an operating mode of the power supply system 100 (e.g., in CCM or in discontinuous conduction mode (DCM)). As a second example, the power supply system can operate in DCM, so the clamping switch can be activated at a predetermined time that is prior to the activation of each of the input switches, along with concurrent activation of one of the output switches (or one of the pairs of output switches) in the output stage 104 to facilitate ZVS. As a result, the power supply system can operate more efficiently by mitigating ringing in the output stage 104 and, based on activating the clamping switch during the activation dead-time of the input switches of the input stage 102, by providing ZVS of the input switches in the input stage 102.

Figure 2:
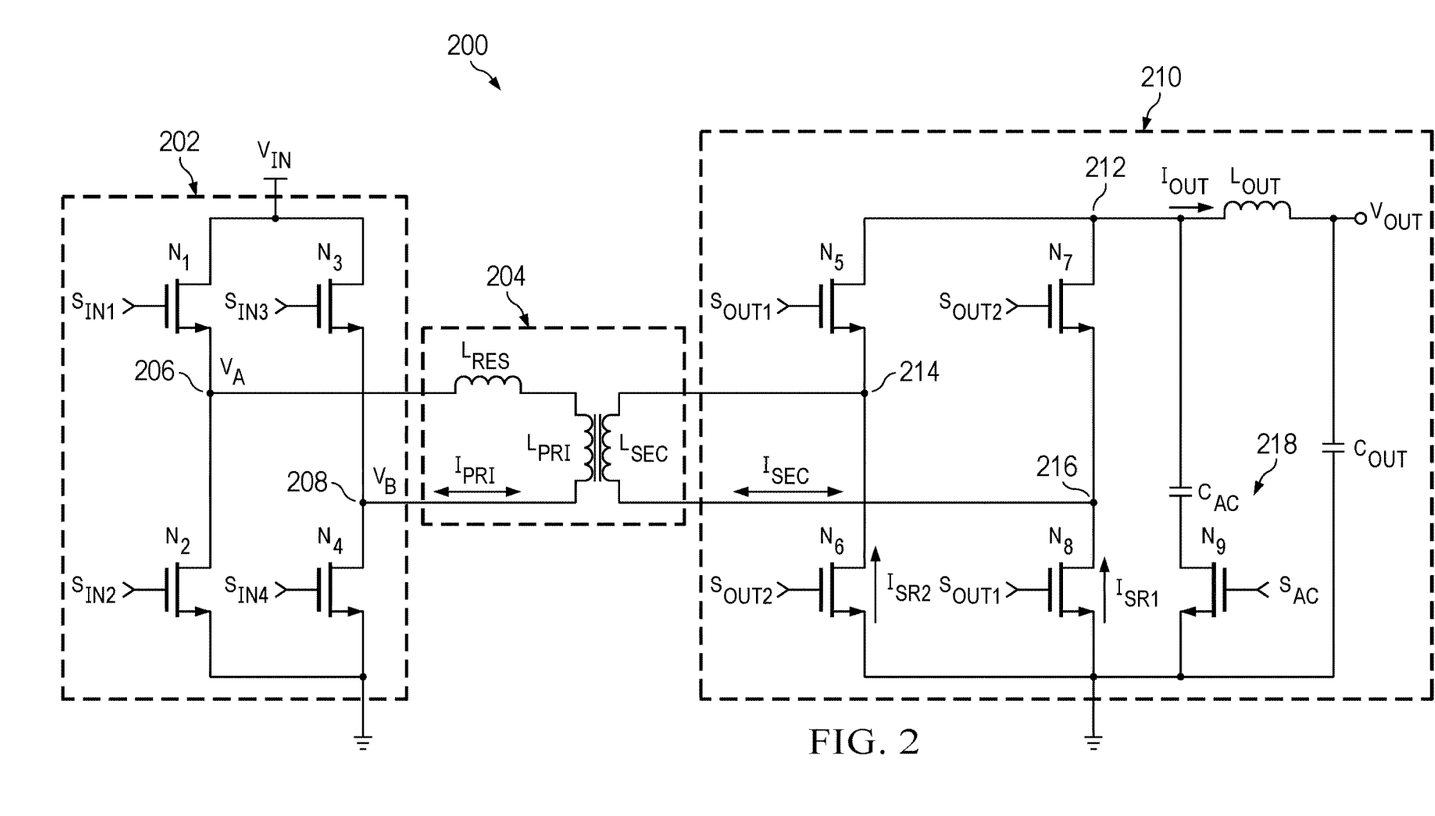
FIG. 2 is a schematic diagram of a power supply circuit.

FIG. 2 is a block diagram of a power supply system 200. The power supply system 200 can be configured to generate an output voltage $V_{OUT}$ based on an input voltage $V_{IN}$. The power supply system 200 can be used to implement the power supply system 100 in the example of FIG. 1. Therefore, reference is to be made to the example of FIG. 1 in the following description of the example of FIG. 2.

The power supply system 200 includes an input stage 202 and a transformer 204. In the example of FIG. 2, the transformer 204 includes a primary winding $L_{PRI}$ and a secondary winding $L_{SEC}$ that are inductively coupled, and includes a resonant inductor $L_{RES}$ that can represent a resonant inductance of the primary winding $L_{PRI}$. The input stage 202 includes a first input switch $N_1$, a second input switch $N_2$, a third input switch $N_3$, and a fourth input switch $N_4$ that are formed as a full-bridge. In the example of FIG. 2, the input switches $N_1$, $N_2$, $N_3$, and $N_4$ are demonstrated as N-channel metal-oxide semiconductor field-effect transistors (MOSFETS). The first input switch $N_1$ is arranged as a first high-side switch that interconnects the input voltage $V_{IN}$ and a first terminal 206 that is coupled to the resonant inductor $L_{RES}$ of the transformer 204. The second input switch $N_2$ is arranged as a first low-side switch that interconnects a low voltage rail (e.g., a ground terminal) and the first terminal 206. The third input switch $N_3$ is arranged as a second high-side switch that interconnects the input voltage $V_{IN}$ and a second terminal 208 that is coupled to the primary winding $L_{PRI}$ of the transformer 204. The fourth input switch $N_4$ is arranged as a second low-side switch that interconnects the low voltage rail and the second terminal 208. In the example of FIG. 2, the terminal 206 has a voltage $V_A$ and the second terminal 208 has a voltage $V_B$, so the primary winding $L_{PRI}$ and the resonant inductor $L_{RES}$ have a voltage $V_{AB}$.

The first and fourth input switches $N_1$ and $N_4$ and the second and third input switches $N_2$ and $N_3$ are alternately activated to provide the primary current $I_{PRI}$ in opposing polarities through the primary winding $L_{PRI}$ of the transformer 204. During a first time duration, the first input switch $N_1$ is activated responsive to a first input switching signal $S_{IN1}$ and the fourth input switch $N_4$ is activated responsive to a fourth input switching signal $S_{IN4}$. Therefore, during the first time duration, the primary current $I_{PRI}$ is provided from the input voltage $V_{IN}$, through the first input switch NI, through the resonant inductor $L_{RES}$, through the primary winding $L_{PRI}$ in a first polarity, through the fourth input switch $N_4$, to the low-voltage rail. As an example, the input switching signals $S_{IN1}$ and $S_{IN4}$ can be staggered to provide for a staggered activation of the respective input switches $N_1$ and $N_4$ to control the primary current $I_{PRI}$ through the primary winding $L_{PRI}$.

During a second time duration, the second input switch $N_2$ is activated responsive to second input switching signal $S_{IN2}$ and the third input switch $N_3$ is activated responsive to third input switching signal $S_{IN3}$. Therefore, during the second time duration, the primary current $I_{PRI}$ is provided from the input voltage $V_{IN}$, through the third input switch $N_3$, through the primary winding $L_{PRI}$ in a second polarity opposite the first polarity, through the resonant inductor $L_{RES}$, through the second input switch $N_2$, to the low-voltage rail. As an example, the input switching signals $S_{IN1}$ and $S_{IN4}$ can be staggered to provide for a staggered activation of the respective input switches $N_1$ and $N_4$ to control the primary current $I_{PRI}$ through the primary winding $L_{PRI}$. As an example, the input switching signals $S_{IN1}$, $S_{IN2}$, $S_{IN3}$, and $S_{IN4}$ can be provided from a switching controller (e.g., the switching controller 108). The first input switching signal $S_{IN1}$ and the second input switching signal $S_{IN2}$ can be separated by a switching dead-time during which neither of the respective input switches $N_1$ and $N_2$ are activated. Similarly, the third input switching signal $S_{IN3}$ and the fourth input switching signal $S_{IN4}$ can be separated by a switching dead-time during which neither of the respective input switches $N_3$ and $N_4$ are activated The power supply system 200 also includes an output stage 210. The output stage 210 includes a first output switch $N_5$, a second output switch $N_6$, a third output switch $N_7$, and a fourth output switch $N_8$ that are formed as a full-bridge rectifier. In the example of FIG. 2, the output switches $N_5$, $N_6$, $N_7$, and $N_8$ are demonstrated as N-FETs. The first output switch $N_5$ interconnects a terminal 212 and a terminal 214 that is coupled to the secondary winding $L_{SEC}$ of the transformer 204. The terminal 212 is also coupled to an output inductor $L_{OUT}$ that is configured to conduct an output current $I_{OUT}$. The second output switch $N_6$ interconnects the terminal 214 and a low-voltage rail (e.g., a ground terminal). The third output switch $N_7$ interconnects the terminal 212 and a terminal 216 that is coupled to the secondary winding $L_{SEC}$ of the transformer 204. The fourth output switch $N_8$ interconnects the terminal 216 and the low voltage rail.

The first and fourth output switches $N_5$ and $N_8$ and the second and third output switches $N_6$ and $N_7$ are alternately activated to conduct the secondary current $I_{SEC}$ from the secondary winding $L_{SEC}$ to the output inductor $L_{OUT}$. During a first time duration, the first output switch $N_5$ and the fourth output switch $N_8$ are activated concurrently responsive to first output switching signal $S_{OUT1}$. Therefore, during the first time duration, the secondary current $I_{SEC}$ is provided as a first rectifier current $I_{SR1}$ from the low voltage rail, through the fourth output switch $N_8$, through the secondary winding $L_{SEC}$ in a first polarity, and through the first output switch $N_5$ to the terminal 212. During a second time duration, the third output switch $N_7$ and the second output switch $N_6$ are activated concurrently responsive to second output switching signal $S_{OUT2}$. As an example, the output switching signals $S_{OUT1}$ and $S_{OUT2}$ can be provided from a switching controller (e.g., the switching controller 108). Therefore, during the second time duration, the secondary current $I_{SEC}$ is provided as a second rectifier current $I_{SR2}$ from the low voltage rail, through the second output switch $N_6$, through the secondary winding $L_{SEC}$ in a second polarity opposite the first polarity, through the third output switch $N_7$, to the terminal 212. As an example, the first and second time durations of the output stage 210 can approximately coincide with first and second time durations of the input stage 202, respectively. The secondary current $I_{SEC}$ can thus be provided through the output inductor $L_{OUT}$ to provide an output voltage $V_{OUT}$ across an output capacitor $C_{OUT}$. The output voltage $V_{OUT}$ can thus power a load (not shown).

In the example of FIG. 2, the output stage 210 further comprises an active clamping circuit 218 that includes a clamping switch $N_9$ and a capacitor $C_{AC}$ in series between the terminal 212 and the low-voltage rail. The active clamping circuit 218, in response to activation of the clamping switch $N_9$ by a clamp switching signal $S_{AC}$, can conduct a clamping current $I_{CL}$ to the terminal 212 to mitigate ringing of the secondary current $I_{SEC}$ in the output stage 210. As an example, the ringing can occur based on resonant oscillation between the parasitic capacitance of the output switches $N_5$, $N_6$, $N_7$, and $N_8$ and the output inductor $L_{OUT}$ in combination with the resonant inductor $L_{RES}$ in the transformer 204. The ringing can thus be exhibited during a dead-time between activation of the input switches $N_1$ and $N_2$, thereby providing power inefficiencies based on a drain-source voltage $V_{DS}$ being exhibited on the output switches $N_5$, $N_6$, $N_7$, and $N_8$ in the output stage 210. Thus, the clamping current $I_{CL}$ can include a portion of the ringing secondary current $I_{SEC}$ (e.g., the active clamping circuit 218 can provide a current path for a portion of the ringing secondary current $I_{SEC}$) to clamp the drain-source voltage $V_{DS}$, thereby providing for a more energy efficient operation of the power supply system 200. Also, as described in greater detail herein, the clamping switch $N_9$ can be activated during the dead-time between activation of the pair of the input switches $N_1$ and $N_2$ to facilitate ZVS of the input switches $N_1$ and $N_2$.

The operation of the power supply system 200 can be based on load conditions. As an example, the power supply system 200 can operate in CCM based on providing the output voltage $V_{OUT}$ to a heavier load. Thus, to facilitate ZVS, the clamping switch of the active clamping circuit 218 can be activated at a predetermined time that is approximately half a ringing period of the primary current $I_{PRI}$ after deactivation of the input switches (e.g., the input switches $N_1$ and $N_2$) of the input stage 202.

Figure 3:
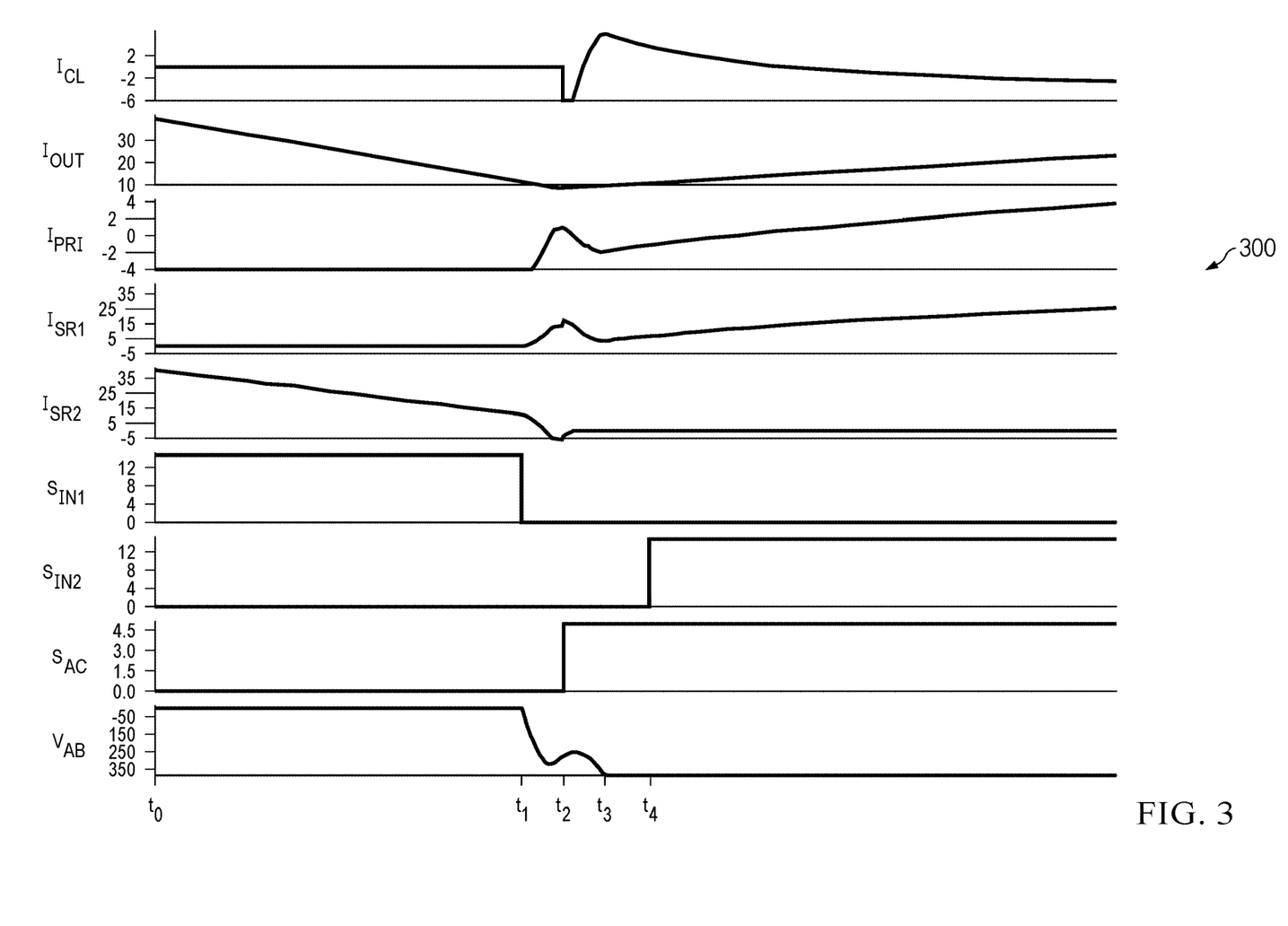
FIG. 3 is a timing diagram.

FIG. 3 is a timing diagram 300. The timing diagram 300 demonstrates a number of the signals, currents, and voltages associated with the power supply system 200 in the example of FIG. 2 operating in CCM. Therefore, reference is to be made to the example of FIG. 2 in the following description of the example of FIG. 3.

The timing diagram 300 includes the clamping current $I_{CL}$, the output current $I_{OUT}$, the primary current $I_{PRI}$, the first rectifier current $I_{SR1}$ through the output switches $N_5$ and $N_8$, a second rectifier current $I_{SR2}$ through the output switches $N_6$ and $N_7$, the input switching signals $S_{IN1}$ and $S_{IN2}$, and the voltage VAS across the primary winding $L_{PRI}$ of the transformer 204.

Prior to a time to, the input switching signal $S_{IN1}$ was asserted (e.g., logic high) to activate the input switch $N_1$, while the input switching signal $S_{IN2}$ is de-asserted (e.g., logic low) to deactivate the input switch $N_2$. Therefore, the primary current $I_{PRI}$ flows through the input switch $N_1$, through the primary winding $L_{PRI}$, and through the input switch $N_4$ (e.g., shortly after activation of the input switch $N_1$.) Thus, the primary current $I_{PRI}$ is demonstrated as being provided in the first polarity (e.g., less than −4 amps in the example of FIG. 3). The voltage $V_{AB}$ is thus demonstrated as having an amplitude of approximately zero, as resulting from an approximate equal amplitude of both the voltages $V_A$ and $V_B$. Concurrently, the secondary current $I_{SEC}$ is induced in the secondary winding $L_{SEC}$ from the primary winding $L_{PRI}$, and is therefore provided as the second rectifier current $I_{SR2}$, and thus the output current $I_{OUT}$ (decreasing in amplitude as it is provided to the load).

At a time $t_1$, the input switching signal $S_{IN1}$ is de-asserted (e.g., logic low) to deactivate the input switch $N_1$. Also at the time $t_1$, the input switching signal $S_{IN2}$ remains de-asserted (e.g., logic low) to deactivate the input switch $N_2$. Therefore, the time $t_1$ is the beginning of a switching dead-time of the input switches $N_1$ and $N_2$. At the time $t_1$, the primary current $I_{PRI}$ begins ringing (e.g., resonant oscillation among the parasitic capacitance of the input switches $N_1$ and $N_2$, the resonant inductor $L_{RES}$, the output inductor $L_{OUT}$, and the parasitic capacitance of the output switches $N_5$, $N_6$, $N_7$, and $N_8$), and thus beings to increase. At the time $t_1$, the secondary current $I_{SEC}$ begins ringing, and thus the rectifier currents $I_{SR1}$ and $I_{SR2}$ begin to oscillate based on the parasitic capacitance of the output switches $N_5$, $N_6$, $N_7$, and $N_8$ and the output inductor $L_{OUT}$. Also at the time $t_1$, the voltage $V_{AB}$ decreases sharply as the voltage $V_B$ increases relative to the voltage $V_A$.

At a time $t_2$, the clamp switching signal $S_{AC}$ is asserted to activate the clamping switch $N_9$, and the clamping current $I_{CL}$ begins to flow. As an example, the time $t_2$ can be associated with an approximate peak of the ringing of the primary current $I_{PRI}$, and can thus be one-half of the ringing period of the primary current $I_{PRI}$. As an example, the time $t_2$ can be set based on the switching controller 108 monitoring the amplitude of the primary current $I_{PRI}$, and thus associating the time $t_2$, and therefore the activation of the clamping switch $N_9$ by the clamp switching signal $S_{AC}$, to the approximate ringing peak of the primary current $I_{PRI}$. For example, the time $t_2$ can be statically (e.g., open-loop) set during fabrication and testing of the switching controller 108 with respect to a given power supply system 200. As another example, the switching controller 108 can set the time $t_2$ at each switching cycle in a closed-loop feedback manner.

By activating the clamping switch $N_9$ at the time $t_2$, the primary winding $L_{PRI}$ does not dissipate as much magnetic energy, and thus maintains additional magnetic energy. As a result, the ringing of the primary current $I_{PRI}$ is mitigated after the time $t_2$, resulting in a more rapid shift of the relative amplitudes of the voltages $V_A$ and $V_B$. Accordingly, the voltage $V_B$ decreases more rapidly to facilitate ZVS. In other words, because the ringing of the primary current $I_{PRI}$ is mitigated (and thus settles) after the time $t_2$, the oscillation of the voltage $V_{AB}$ is likewise mitigated after the time $t_2$. At a time $t_3$, the voltage $V_{AB}$ decreases to a minimum amplitude as the voltage $V_B$ increases to an approximate maximum amplitude and the voltage $V_A$ decreases to approximate zero.

At a time $t_4$, the input switching signal $S_{IN2}$ is asserted (e.g., logic high) to activate the input switch $N_2$, while the input switching signal $S_{IN1}$ remains de-asserted (e.g., logic low) to deactivate the input switch $N_1$. Therefore, the primary current $I_{PRI}$ flows through the input switch $N_3$, through the primary winding $L_{PRI}$, and through the input switch $N_2$ (e.g., shortly after activation of the input switch $N_3$). Because the voltage VAS is at a minimum amplitude resulting from an approximate zero amplitude of the voltage $V_A$, the activation of the input switch $N_2$ can be provided at approximate zero volts of the voltage $V_A$. Accordingly, the input switch $N_2$ can be activated in a ZVS manner. The ZVS process can be repeated in approximately the same manner after de-assertion of the input switching signal $S_{IN2}$, and thus deactivation of the input switch $N_2$.

As described above, the example of FIG. 3 is described with respect to CCM operation of the power supply system 200. As another example, the power supply system 200 can operate in DCM based on providing the output voltage $V_{OUT}$ to a lighter load. Thus, to facilitate ZVS, the clamping switch of the active clamping circuit 218 can be activated at a predetermined time that is just prior to activation of the input switches (e.g., the input switches $N_1$ and $N_2$) of the input stage 202.

Figure 4:
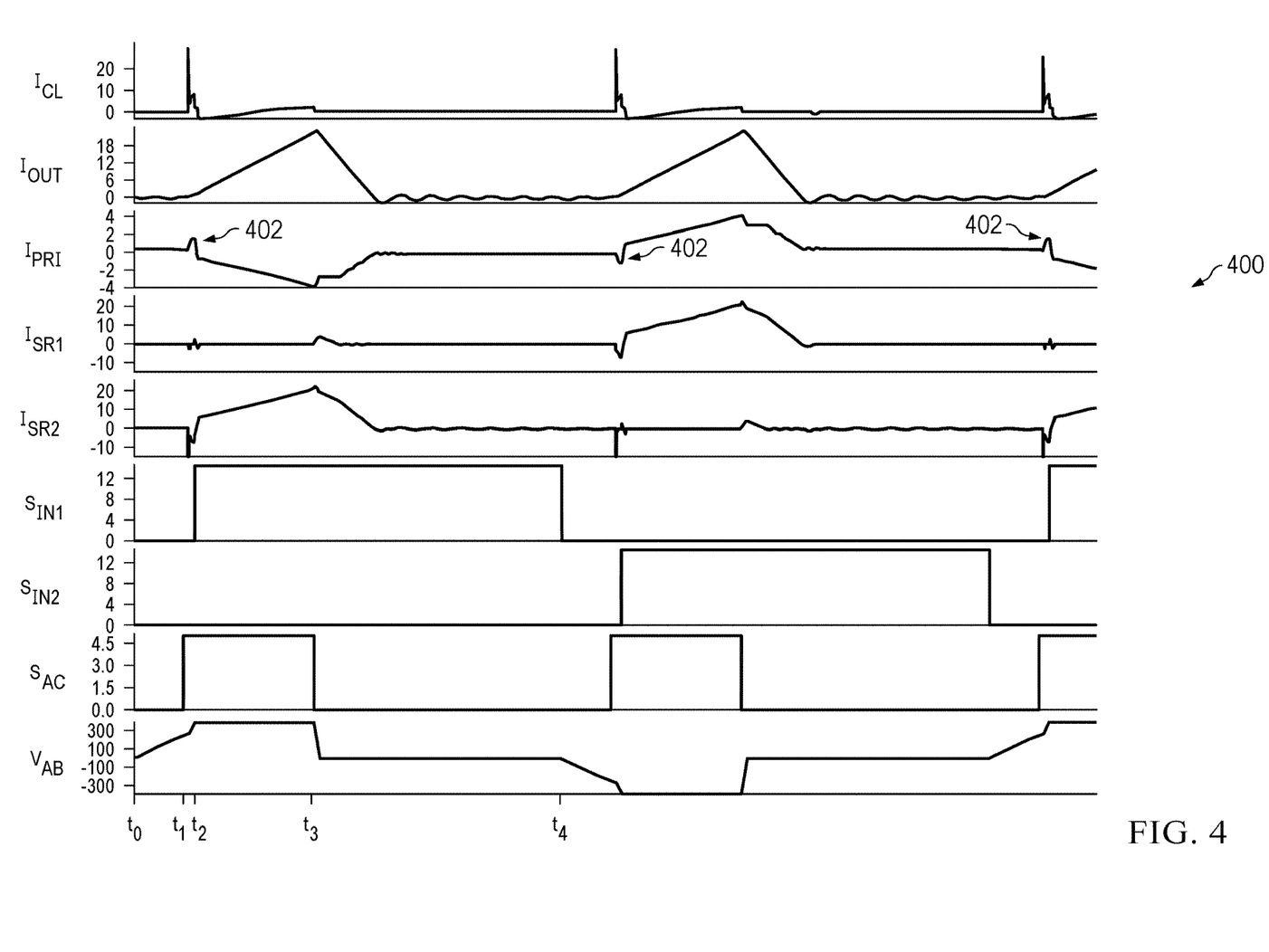
FIG. 4 is another timing diagram.

FIG. 4 is a timing diagram 400. The timing diagram 400 demonstrates a number of the signals, currents, and voltages associated with the power supply system 200 in the example of FIG. 2 operating in DCM. Therefore, reference is to be made to the example of FIG. 2 in the following description of the example of FIG. 4.

The timing diagram 400 includes the clamping current $I_{CL}$, the output current $I_{OUT}$, the primary current $I_{PRI}$, the first rectifier current $I_{SR1}$ through the output switches $N_5$ and $N_8$, a second rectifier current $I_{SR2}$ through the output switches $N_6$ and $N_7$, the input switching signals $S_{IN1}$ and $S_{IN2}$, and the voltage VAS across the primary winding $L_{PRI}$ of the transformer 204.

Prior to a time to, the input switching signal $S_{IN2}$ was de-asserted (e.g., logic low) to deactivate the input switch $N_2$, while the input switching signal $S_{IN1}$ was likewise de-asserted to deactivate the input switch $N_1$. Therefore, at the time to, the power supply system 200 is in a switching dead-time with respect to the input switches $N_1$ and $N_2$. Because the power supply system 200 is operating in DCM, the primary current $I_{PRI}$ has an amplitude of approximately zero, as well as the rectifier currents $I_{SR1}$ and $I_{SR2}$ and the output current $I_{OUT}$.

At a time $t_1$, the clamp switching signal $S_{AC}$ is asserted to activate the clamping switch $N_9$, and the clamping current $I_{CL}$ begins to flow. A short time later, at a time $t_2$, the input switching signal Sim is asserted (e.g., logic high) to activate the input switch $N_1$. Therefore, the activation of the clamp switching signal $S_{AC}$ is provided at a time just prior to activation of one of the input switch (e.g., the input switch $N_1$ with respect to the times $t_1$ and $t_2$). Also, concurrently with the activation of the clamping switch $N_9$ at the time $t_1$, the output switches $N_6$ and $N_7$ can be activated by the output switching signals $S_{OUT1}$. Therefore, the output switches $N_6$ and $N_7$ can be activated slightly earlier than the input switch $N_1$.

The activation of the clamping switch $N_9$ and the output switches $N_6$ and $N_7$ can facilitate injection of the clamping current $I_{CL}$ from the secondary winding $L_{SEC}$ to the primary winding $L_{PRI}$. In other words, prior to activation of the input switch $N_1$ at the time $t_2$, the secondary current $I_{SEC}$ (comprised primarily of the clamping current $I_{CL}$) is injected from the secondary winding $L_{SEC}$ to the primary winding $I_{PRI}$ to increase the primary current $I_{PRI}$, as demonstrated generally at 402 by the non-zero amplitude spike in the primary current $I_{PRI}$. Therefore, additional magnetic energy is provided in the primary winding $L_{PRI}$ by the current induced from the secondary winding $L_{SEC}$. As a result, the relative amplitudes of the voltages $V_A$ and $V_B$ shift more rapidly. Accordingly, the voltage $V_B$ increases from the time $t_1$ more rapidly to facilitate ZVS. The time $t_2$ can therefore represent a time when the voltage $V_{AB}$ is at an approximate minimum or maximum, and therefore when one of the voltages $V_A$ and $V_B$ has an amplitude of approximately zero volts.

As an example, the time between the times $t_1$ and $t_2$ can be optimized based on the amplitude of the primary current $I_{PRI}$ and the amplitude of the voltage $V_{AB}$. For example, the time $t_1$ can be set prior to the time $t_2$ based on the switching controller 108 monitoring the amplitude of the primary current $I_{PRI}$, and thus associating the time $t_2$, and therefore the activation of the clamping switch $N_9$ by the clamp switching signal $S_{AC}$, at an approximate time that the voltage $V_{AB}$ achieves a maximum or minimum amplitude. Thus, the primary current $I_{PRI}$ does not increase or decrease for too long to result in inefficient operation (e.g., with respect to generating the output current $I_{OUT}$). For example, the time $t_1$ can be statically (e.g., open-loop) set during fabrication and testing of the switching controller 108 with respect to a given power supply system 200. As another example, the switching controller 108 can set the time $t_1$ at each switching cycle in a closed-loop feedback manner.

At a time $t_3$, which is representative of the end of the output inductor $L_{OUT}$ charging period, the clamp switching signal $S_{AC}$ is de-asserted to deactivate the clamping switch $N_9$. For example, the clamp switching signal $S_{AC}$ can be de-asserted from approximately 100 nS up to the end of output inductor $L_{OUT}$ charging period at $t_3$. The rectifier current $I_{SR2}$ begins to decrease, as well as the output current $I_{OUT}$. Also, the voltage $V_{AB}$ begins to decrease. At a time $t_4$, the input switching signal $S_{IN1}$ is de-asserted (e.g., logic low) to deactivate the input switch $N_1$. Therefore, the time $t_4$ is the beginning of a switching dead-time of the input switches $N_1$ and $N_2$. The timing diagram 400 thus repeats in the opposite phase, similar to as described above, in which the clamping switch $N_9$ is activated just prior to the input switch $N_2$.

Accordingly, as described herein, the active clamping circuit 218 can be implemented not only to mitigate ringing in the output stage 210, but by activating the clamping switch $N_9$ in the active clamping circuit 218 during the dead-time of the input switches $N_1$ and $N_2$, the power supply system 200 can implement ZVS for more energy efficient operation relative to typical power supply systems. The power supply system 200 can be configured to implement ZVS in either CCM operation or DCM operation. As a result, the power supply system 200 can provide for more efficient operation using ZVS of the input switches $N_1$ and $N_2$ of the input stage 202 regardless of load conditions.

In this description, the term "couple" may cover connections, communications, or signal paths that enable a functional relationship consistent with this description. For example, if device A generates a signal to control device B to perform an action, then: (a) in a first example, device A is directly coupled to device B; or (b) in a second example, device A is indirectly coupled to device B through intervening component C if intervening component C does not substantially alter the functional relationship between device A and device B, so device B is controlled by device A via the control signal generated by device A.

In this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is described herein as including certain components may instead be configured to couple to those components to form the described circuitry or device. For example, a structure described herein as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure, either at a time of manufacture or after a time of manufacture, such as by an end-user and/or a third-party.

Modifications are possible in the described embodiments, and other embodiments are possible, within the scope of the claims.

What is claimed is:

1. A power supply system comprising:
an input stage comprising a first input switch and a second input switch, the first and second input switches configured to provide a primary current responsive to respective first and second input switching signals;
a transformer configured to generate a secondary current responsive to the primary current;
an output stage comprising an output, a first output switch, a second output switch and a clamping switch, the output stage configured to generate an output voltage at the output by rectifying the secondary current responsive to respective first and second output switching signals, the clamping switch configured to close responsive to a clamp switching signal during an activation dead-time between closing the first input switch and closing second input switch; and
a switching controller configured to generate the first and second input switching signals and the first and second output switching signals based on the output voltage, and to generate the clamp switching signal.

2. The system of claim 1, wherein the input stage is configured as a full-bridge input stage including:
a third input switch configured to provide the primary current through a primary winding of the transformer in a first polarity with the first input switch responsive to a third input switching signal; and
a fourth input switch configured to provide the primary current through the primary winding in a second polarity with the second input switch responsive to a fourth input switching signal,
and the output stage is configured as a full-bridge output stage including:

a third output switch configured to close responsive to a third output switching signal concurrently with the first output switch; and a fourth output switch configured to close responsive to a fourth output switching signal concurrently with the second output switch.

3. The system of claim 1, wherein the output stage includes a capacitor in series with the clamping switch between a first terminal, which is coupled to an output inductor and the first output switch, and a second terminal coupled to the second output switch at a low-voltage terminal.

4. The system of claim 1, wherein the power supply system is configured to operate in a continuous conduction mode (CCM).

5. The system of claim 4, wherein the clamping switch is configured to conduct a clamping current that is provided to a secondary winding of the transformer to increase a magnetic energy of a primary winding of the transformer to enable zero-volt switching of at least one of the first or second input switches.

6. The system of claim 4, wherein the clamping switch is configured to close responsive to the clamp switching signal at a time that is approximately half a ringing period of the primary current after deactivation of each of the first input switch and the second input switch.

7. The system of claim 1, wherein the power supply system is configured to operate in a discontinuous conduction mode (DCM).

8. The system of claim 7, wherein the clamping switch is configured to conduct a clamping current induced from a secondary winding to a primary winding of the transformer responsive to the clamp switching signal, and the clamping current decreases an amplitude of the primary current to enable zero-volt switching of at least one of the first or second input switches.

9. The system of claim 7, wherein the clamping switch configured to close responsive to the clamp switching signal at a time before closing of each of the first input switch and the second input switch, and a respective one of the first output switch and the second output switch is also configured to close at the time responsive to the respective one of the first and second output switching signals.

10. An integrated circuit (IC) comprising:

a switching controller configured to receive an output voltage from an output stage of a power supply circuit and to generate a first input switching signal and a second input switching signal based on the output voltage, the first and second input switching signals provided to a first input switch and a second input switch, respectively, of an input stage of the power supply circuit, the input stage coupled to the output stage through a transformer, the switching controller also configured to generate a first output switching signal and a second output switching signal that are provided to a first output switch and a second output switch, respectively, of the output stage of the power supply circuit based on the output voltage, and the switching controller further configured to generate a clamp switching signal that is provided to an active clamping circuit of the output stage, the active clamping circuit having a clamping switch configured to close during an activation dead-time between closing the first input switch and closing the second input switch responsive to the clamp switching signal.

11. The IC of claim 10, wherein the active clamping circuit comprises the clamping switch and a capacitor arranged in series between a first terminal coupled to an output inductor and the first output switch and a second terminal coupled to the second output switch at a low-voltage terminal.

12. The IC of claim 10, wherein the power supply circuit is configured to operate in a continuous conduction mode (CCM), wherein the clamping switch is configured to conduct a clamping current that is provided to a secondary winding of the transformer responsive to the clamp switching signal to increase a magnetic energy of a primary winding of the transformer to enable zero-volt switching of at least one of the first or second input switches.

13. The IC of claim 12, wherein the clamping switch is configured to close responsive to the clamp switching signal at a time that is approximately half a ringing period of a primary current in the primary winding after deactivation of each of the first input switch and the second input switch.

14. The IC of claim 10, wherein the power supply circuit is configured to operate in a discontinuous conduction mode (DCM), the clamping switch is configured to conduct a clamping current that is induced from a secondary winding of the transformer to a primary winding of the transformer, in which the clamping current decreases an amplitude of a primary current of the primary winding to enable zero-volt switching of at least one of the first or second input switches.

15. The IC of claim 14, wherein the clamping switch is configured to close responsive to the clamp switching signal at a time that is before closing of each of the first input switch and the second input switch, and a respective one of the first output switch and the second output switch is also configured to close at the time responsive to the respective one of the first and second output switching signals.

16. A circuit comprising:

a power supply circuit including an output, an input stage, and an active clamping circuit, the input stage including first and second input switches, and the active clamping circuit including a clamping switch having a first input; and a switching controller having an input, a first output, a second output, and a third output, the input of the switching controller coupled to the output of the power supply circuit, the first output coupled to the first input switch, the second output coupled to the second input switch, and the third output coupled to the first input, in which the switching controller is configured to provide a clamp switching signal at the third output to close the clamping switch during a dead-time between closing the first input switch and closing the second input switch.

17. The circuit of claim 16, wherein the power supply circuit is configured to operate in a continuous conduction mode (CCM), the clamping switch is configured to conduct a clamping current that is provided to a secondary winding of a transformer to increase a magnetic energy of a primary winding of the transformer to enable zero-volt switching of at least one of the first or second input switches.

18. The circuit of claim 17, wherein the clamping switch is configured to close responsive to the clamp switching signal at a time that is approximately half a ringing period of a primary current in the primary winding of the transformer after deactivation of each of the first input switch and the second input switch.

19. The circuit of claim 16, wherein the power supply circuit is configured to operate in a discontinuous conduction mode (DCM), wherein the clamping switch is configured to close responsive to the clamp switching signal to conduct a clamping current that is induced from a secondary winding of a transformer to a primary winding of the transformer, wherein the clamping current decreases an amplitude of a primary current in the primary winding to enable zero-volt switching of at least one of the first or second input switches.

20. The circuit of claim 19, wherein the clamping switch is configured to close responsive to a clamp switching signal at a time that is before the closing of each of the first input switch and the second input switch, wherein the power supply circuit further comprises an output stage including first and second output switches, one of the first output switch or the second output switch being configured to close at the time responsive to a respective one of a first output switching signal and a second output switching signal.

21. The circuit of claim 16, wherein the switching controller is implemented in an integrated circuit (IC).

\* \* \* \* \*